US010355933B2

(12) United States Patent
Bowles et al.

(10) Patent No.: US 10,355,933 B2
(45) Date of Patent: Jul. 16, 2019

(54) DEPENDENCY GRAPH FOR COORDINATION OF DEVICE CONFIGURATION

(71) Applicant: Microsoft Technology Licensing, LLC, Redmond, WA (US)

(72) Inventors: Sean Anderson Bowles, Seattle, WA (US); Peter J. Kaufman, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 284 days.

(21) Appl. No.: 15/476,959

(22) Filed: Mar. 31, 2017

(65) Prior Publication Data
US 2018/0287872 A1 Oct. 4, 2018

(51) Int. Cl.
*G06F 8/41* (2018.01)
*H04L 12/24* (2006.01)
*G06F 9/445* (2018.01)

(52) U.S. Cl.
CPC .......... *H04L 41/0893* (2013.01); *G06F 8/433* (2013.01); *G06F 9/44505* (2013.01);
(Continued)

(58) Field of Classification Search
CPC . H04L 41/0893; H04L 41/0869; H04L 41/12; H04L 41/0816; G06F 9/44521; G06F 9/44505; G06F 8/433
See application file for complete search history.

(56) References Cited

U.S. PATENT DOCUMENTS 5,929,864 A 7/1999 Picott et al.
7,895,572 B2 2/2011 Stienhans
(Continued)

OTHER PUBLICATIONS

"Overview of the MDM Configuration perspective: concepts and features", Retrieved At :«https://www.ibm.com/support/knowledgecenter/SSWSR9_11.3.0/com.ibm.mdshs.wbuser.doc/topics/c_wbuser_concepts_and_features.html», Retrieved Date: Sep. 23, 2016, 2 pages.
(Continued)

*Primary Examiner* — Michael A Keller
(74) *Attorney, Agent, or Firm* — Medley, Behrens & Lewis, LLC

(57) ABSTRACT

Various technologies described herein pertain to controlling configuration of a computing device. A configuration request can be received, at the computing device, from a configuration source external to the computing device. The configuration request can include configuration data for a dependent feature. An evaluation can be performed at the computing device to determine whether a dependency graph for the dependent feature is satisfied. The dependency graph for the dependent feature can specify interdependencies between configurations of a set of features such that remaining features in the set of features are to be configured prior to enabling the dependent feature to be configured. Moreover, the dependent feature can be configured based on the configuration data when the dependency graph for the dependent feature is satisfied. The configuring of the dependent feature based on the configuration data can be prohibited prior to the dependency graph for the dependent feature being satisfied.

20 Claims, 8 Drawing Sheets

(52) U.S. Cl.
CPC ...... *G06F 9/44521* (2013.01); *H04L 41/0816* (2013.01); *H04L 41/0869* (2013.01); *H04L 41/12* (2013.01)

(56) References Cited

U.S. PATENT DOCUMENTS

| | | |
|---|---|---|
| 7,950,007 B2 | 5/2011 | Mohindra et al. |
| 8,214,372 B2 | 7/2012 | Gupta et al. |
| 8,392,465 B2 | 3/2013 | Bojanic et al. |
| 9,270,674 B2 | 2/2016 | Lang et al. |
| 2003/0131226 A1 | 7/2003 | Spencer et al. |
| 2006/0277307 A1 | 12/2006 | Bernardin et al. |
| 2011/0307877 A1* | 12/2011 | Lambert .................. G06F 8/72 717/166 |
| 2015/0358198 A1* | 12/2015 | Mahajan ............... H04L 41/082 709/221 |
| 2016/0094386 A1 | 3/2016 | Kaufman et al. |
| 2016/0099969 A1 | 4/2016 | Angus et al. |
| 2017/0289060 A1* | 10/2017 | Aftab .................. H04L 67/1097 |

OTHER PUBLICATIONS

Zheng, et al., "Automatic Configuration of Internet Services", In ACM SIGOPS Operating Systems Review, vol. 41, No. 3, Mar. 21, 2007, 12 pages.

* cited by examiner

DEPENDENCY GRAPH FOR COORDINATION OF DEVICE CONFIGURATION

BACKGROUND

Configuration sources (e.g., remote servers, remote agents) external to a computing device can configure features on the computing device. The features configured by the configuration sources can include policies, configuration profiles, resources (e.g., applications), and the like. For instance, features enforced on the computing device can be controlled to secure and manage the computing device. Configuration of the features by the configuration sources can be interdependent; yet, the features can be independently managed. By way of illustration, a first feature may be configured only after a second feature has been configured on the computing device, where the first and second features can be independently managed (e.g., a first configuration source can configure the first feature and a second configuration source can configure the second feature).

Configuration sources conventionally can manage the dependencies between features. For instance, configuration sources can sequence communications with a computing device in such a way that the computing device is in a desired state. According to an illustration where a configuration source negotiates dependencies between features to configure a data protection feature on a computing device, the configuration source can initially install a certificate on the computing device. The configuration source can wait for the installation of the certificate to complete, and once the certificate is installed, the configuration source can install a virtual private network (VPN) profile on the computing device. Again, the configuration source can wait for the VPN profile installation to complete, and then the data protection feature can be configured by the configuration source. However, connectivity between configuration sources and a computing device may be unreliable, so it may be difficult for the configuration sources to synchronize with the computing device and manage configuration state transitions. Moreover, it may be difficult to coordinate configuration in such a way to guarantee correct state, since enforcement and/or implementation of configuration can be dictated by components on the computing device.

SUMMARY

Described herein are various technologies that pertain to controlling configuration of a computing device. A configuration request can be received, at the computing device, from a configuration source external to the computing device. The configuration request can include configuration data for a dependent feature. An evaluation can be performed at the computing device to determine whether a dependency graph for the dependent feature is satisfied. The dependency graph for the dependent feature can specify interdependencies between configurations of a set of features such that remaining features in the set of features are to be configured prior to enabling the dependent feature to be configured. The features in the set can be independently managed (e.g., by different vendors, by different independent subsystems of a configuration source, by different configuration sources); according to an example, at least one of the remaining features in the set can be configured by a differing configuration source external to the computing device. Moreover, the dependent feature can be configured based on the configuration data when the dependency graph for the dependent feature is satisfied. The configuring of the dependent feature based on the configuration data can be prohibited prior to the dependency graph for the dependent feature being satisfied. Thus, while at least one of the remaining features in the set is not configured, configuration of the dependent feature based on the configuration data can be prohibited.

According to various embodiments, the dependent feature can be set based on the configuration data in response to receiving the configuration request at the computing device. Thus, the configuration request can be received from the configuration source, and the dependent feature can be set based on the configuration data in response to receiving the configuration request. A state of the dependent feature retained in a data store of the computing device can be modified based on the setting of the dependent feature. Moreover, the evaluation of whether the dependency graph for the dependent feature is satisfied can be performed subsequent to the dependent feature being set based on the configuration data. Further, configuring the dependent feature based on the configuration data when the dependency graph for the dependent feature is satisfied can include publishing the state of the dependent feature as modified to the computing device. Publication of the state of the dependent feature as modified can be delayed until the dependency graph for the dependent feature is satisfied. Moreover, publishing the state of the dependent feature as modified to the computing device can activate the dependent feature as set based on the configuration data on the computing device.

Pursuant to other embodiments, the configuration data for the dependent feature can be retained in a data store of the computing device in response to receiving the configuration request at the computing device. Accordingly, the configuration request that includes the configuration data for the dependent feature can be received at the computing device, and responsive to receiving the configuration request, the configuration data for the dependent feature can be retained in the data store of the computing device. Moreover, the dependent feature can be configured responsive to identifying that the dependency graph for the dependent feature is satisfied, such that the dependent feature can be configured based on the configuration data retained in the data store the computing device.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
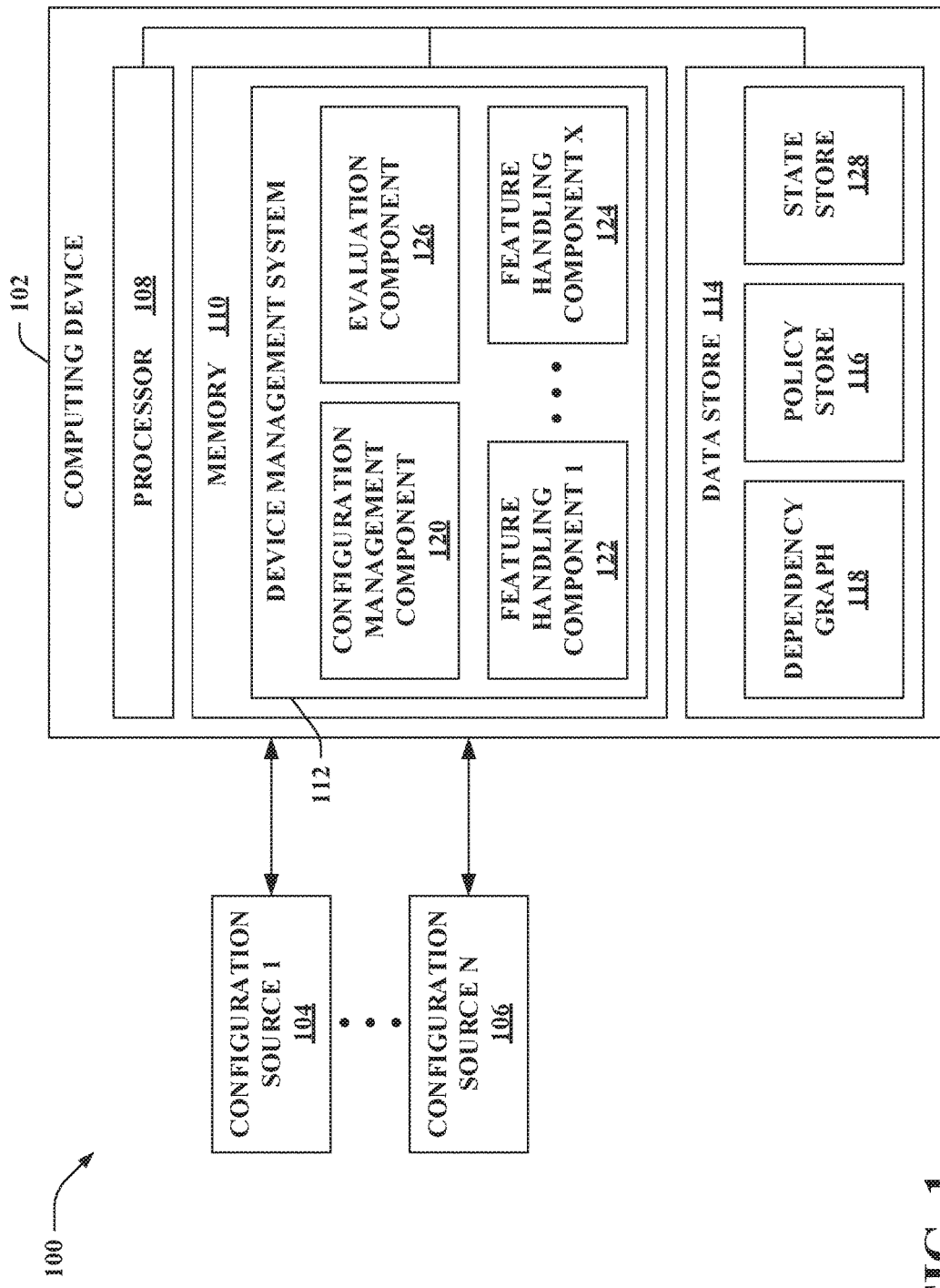
FIG. 1 illustrates a functional block diagram of an exemplary system that controls configuration of a computing device.

Various technologies pertaining to controlling configuration of a computing device are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Referring now to the drawings, FIG. 1 illustrates a system 100 that controls configuration of a computing device 102. The system 100 includes the computing device 102 and one or more configuration sources, namely, a configuration source 1 104, . . . , and a configuration source N 106, where N can be substantially any integer greater than one (collectively referred to herein as configuration sources 104-106). The configuration sources 104-106 can transmit configuration requests to the computing device 102 that control enabling and/or disabling features on the computing device 102. While the system 100 is shown as including multiple configuration sources 104-106, it is to be appreciated that the system 100 can alternatively include one configuration source.

The computing device 102 includes at least one processor 108 and memory 110. The processor 108 is configured to execute instructions loaded into the memory 110 (e.g., one or more systems loaded into the memory 110 are executable by the processor 108, one or more components loaded into the memory 110 are executable by the processor 108). As described in greater detail herein, the memory 110 includes a device management system 112 that controls configuring the computing device 102 based on configuration request(s) received from one or more of the configuration sources 104-106. The device management system 112 manages configuration of features on the computing device 102 based on dependencies between the features, as opposed to relying on the configuration sources 104-106 to manage such dependencies.

Various types of computing devices are intended to fall within the scope of the hereto appended claims. The computing device 102 can be a mobile computing device. Examples of a mobile computing device include a laptop computing device, a mobile telephone (e.g., a smartphone), a tablet computing device, a wearable computing device, a handheld computing device, a portable gaming device, a personal digital assistant, a portable all-in-one computing device, or the like. Pursuant to other examples, the computing device 102 can be a desktop computing device, a gaming console, an embedded computing device (e.g., connectable via the Internet of things (IoT)), and so forth.

The configuration sources 104-106 can include remote servers or remote agents that are external to the computing device 102. For instance, the configuration sources 104-106 can include various types of enterprise device management servers. An example of an enterprise device management server is a mobile device management (MDM) server. An MDM server can control and protect data and configuration settings on computing devices using over-the-air distribution of applications, data, and policy configuration requests. Moreover, other types of enterprise device management servers can provide remote control, patch management, software distribution, operating system deployment, network access protection, and inventory management for computing devices. Yet, the claimed subject matter is not limited to the foregoing examples, as other types of enterprise device management servers are intended to fall within the scope of the hereto appended claims (e.g., the configuration sources 104-106 can additionally or alternatively include a messaging server and/or a document server). Moreover, although not depicted, it is contemplated that the computing device 102 can further include an internal configuration source (e.g., an application executed by the processor 108 of the computing device 102 can send a configuration request to the device management system 112); thus, the examples set forth herein can be extended to a scenario where the computing device 102 includes an internal configuration source in addition to one or more of the configuration sources 104-106.

The configuration sources 104-106 can cause features to be configured on the computing device 102. The features configured by the configuration sources 104-106 can include policies, configuration profiles, resources (e.g., applications), and the like. The configuration of features by the configuration sources 104-106 can be interdependent. As described herein, a dependent feature is a feature that is dependent on a state of one or more other features. For example, a dependent policy or setting can only be enabled on the computing device 102 if other features (upon which the dependent policy or setting depend) are set on the computing device 102. To cause features to be configured on the computing device 102, the configuration sources 104-106 can transmit configuration requests to the computing device 102. The configuration requests can include configuration data for features to be enabled on the computing device 102. Configuration data for a feature, for example, can include at least one of a policy value, a certificate, a profile, or a setting for the feature. Moreover, a configuration request can be a Synchronization Markup Language (SyncML) message, an Extensible Markup Language (XML) message, or the like; yet, other formats are intended to fall within the scope of the hereto appended claims. A protocol (e.g., Open Mobile Alliance (OMA) Device Management (DM)) used for the configuration requests sent from the configuration sources 104-106, however, may not allow for combinatorically linking configurations of features; rather, the techniques set forth herein allow for the device management system 112 to manage relations between features.

According to many of the examples set forth herein, the dependent feature can be a data protection feature. When active on the computing device 102, the data protection feature can separate applications and data for work from personal applications and data as well as protect the applications and data for work. Yet, it is to be appreciated that other types of dependent features are intended to fall within the scope of the hereto appended claims, and thus, the claimed subject matter is not so limited.

The computing device 102 further includes a data store 114. The data store 114 includes a policy store 116 that stores current values of policies that are enforced on the computing device 102. A current policy value of a policy can be retrieved from the policy store 116 (e.g., by other components of the computing device 102). Additionally or alternatively, a notification can be sent (e.g., to other components of the computing device 102) responsive to a change in a current policy value of a policy stored in the policy store 116. Accordingly, when a policy value for a policy is activated on the computing device 102, the policy value for the policy can be published in the policy store 116.

The data store 114 further includes a dependency graph 118 for a dependent feature. The dependency graph 118 for the dependent feature can specify interdependencies between configurations of a set of features such that remaining features in the set of features are to be configured prior to enabling the dependent feature to be configured. The features in the set can be independently managed (e.g., by different vendors, by different independent subsystems of one of the configuration sources 104-106, by different configuration sources 104-106). While the data store 114 is described in many examples as including one dependency graph 118, it is contemplated that the data store 114 can include multiple dependency graphs for various dependent features. For instance, the data store 114 can include a different dependency graph for a different dependent feature, where the different dependency graph can specify interdependencies between configurations of a different set of features such that the remaining features in the different set of features are to be configured prior to enabling the different dependent feature to be configured. Moreover, dependency graph(s) can be added, deleted, updated, and so forth in the data store 114 over time (e.g., to allow configuring of additional dependent features to be controlled).

Conventionally, configuration source(s) manage an order at which configuration requests reach a computing device. Such traditional management can be difficult at best, due to connectivity issues between the configuration source(s) and the computing device, actual states of features on the computing device differing from anticipated states assumed by the configuration source(s), and so forth. With conventional management techniques, a dependent feature can be misconfigured, which can detrimentally impact user experience. In contrast, the dependency graph 118 can specify rules for applying configurations of features when conditions are met.

A configuration source (e.g., one of the configuration sources 104-106) external to the computing device 102 can transmit a configuration request to the computing device 102. The configuration request can include configuration data for the dependent feature (e.g., corresponding to the dependency graph 118); thus, the configuration source can attempt to configure the dependent feature by sending the configuration request. Moreover, the computing device 102 can receive the configuration request that includes the configuration data for the dependent feature.

Subsequent to receiving the configuration request that includes the configuration data for the dependent feature, the device management system 112 can evaluate whether the dependency graph 118 for the dependent feature is satisfied. The dependency graph 118 for the dependent feature can specify the interdependencies between configurations of a set of features such that remaining features in the set of features are to be configured prior to enabling the dependent feature to be configured. The device management system 112 can configure the dependent feature based on the configuration data when the dependency graph 118 for the dependent feature is satisfied. Further, the device management system 112 can prohibit the configuring of the dependent feature based on the configuration data prior to the dependency graph 118 for the dependent feature being satisfied.

More particularly, the device management system 112 includes a configuration management component 120 and a plurality of feature handling components, namely, a feature handling component 1 122, . . . , and a feature handling component X 124, where X can be substantially any integer greater than one (collectively referred to herein as feature handling components 122-124). While the device management system 112 is described herein as including more than one feature handling component 122-124, it is to be appreciated that the device management system 112 can alternatively include one feature handling component.

The configuration management component 120 can manage operations on the feature handling components 122-124. By way of illustration, the configuration management component 120 can cause the feature handling component 1 122 to set a feature responsive to receiving a configuration request that includes configuration data for such feature (e.g., the configuration management component 120 can identify that the feature is handled by the feature handling component 1 122 and can send a command to set the feature to the feature handling component 1 122). Moreover, the feature handling components 122-124 are components at the computing device 102 that handle configuration requests for specific features. For instance, each feature can have a respective feature handling component. By way of illustration, the feature handling component 1 122 (a first plugin) can handle a first feature (e.g., the dependent feature) and the feature handling component X 124 (a second plugin) can handle a second feature (e.g., a particular remaining feature in the set of features specified in the dependency graph 118). Additionally or alternatively, a generic feature handling component (e.g., one of the feature handling components 122-124) can handle configuring a group of features (e.g., simple configuration settings can be handled by the generic feature handling component).

The device management system 112 can coordinate independent features into a synthetic feature or policy state, which can be described by a dependency graph (e.g., the dependency graph 118 of the dependent feature). State transitions for the independent features are managed by the feature handling components 122-124 (e.g., separate plugins on the computing device 102). The state transitions for the features can be used by the device management system 112 to determine a synthetic state of the computing device 102. Thus, multiple, unrelated configuration endpoints (e.g., the feature handling components 122-124) controlled by independent subsystems can contribute to a higher order, combined configuration state of the computing device 102; the combined configuration state can be utilized to determine whether a dependent feature can be configured on the computing device 102.

The device management system 112 coordinates configuration of features to enable such features to be implemented as intended. The dependency graph 118 can specify a predefined order for configuring features in a set. Accordingly, configuration data for features can be pushed from different configuration sources 104-106, and the dependency graph 118 can be employed by the device management system 112 to control implementing such features on the computing device 102.

According to an example, the device management system 112 can be part of an operating system of the computing device 102 (e.g., the memory 110 can include the operating system and the operating system can include the device management system 112). Pursuant to another example, the device management system 112 can be a third party system that integrates with the operating system of the computing device 102.

Figure 2:
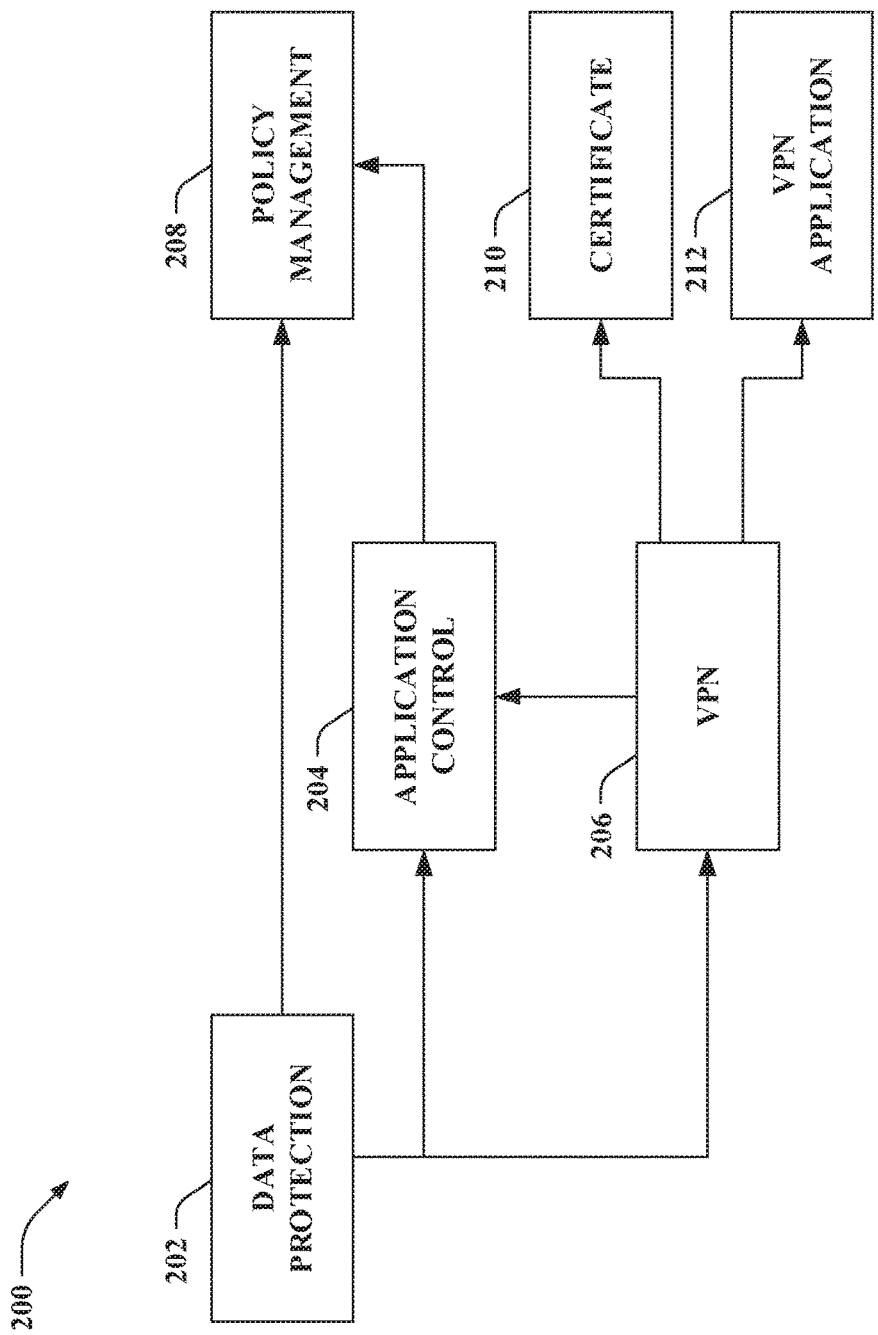
FIG. 2 illustrates an exemplary dependency graph for a data protection feature.

Turning now to FIG. 2, illustrated is an exemplary dependency graph 200 (e.g., the dependency graph 118) for a data protection feature 202. The dependency graph 200 is provided for illustration purposes; it is contemplated that differing dependency graphs are intended to fall within the scope of the hereto appended claims. For instance, dependency graph(s) for other dependent features are intended to fall within the scope of the claims. Moreover, other dependency graph(s) for the data protection feature that include a different set of dependencies are intended to fall within the scope of the claims (e.g., one or more of the dependencies shown in the dependency graph 200 of FIG. 2 can be removed, one or more dependencies can be added to the dependency graph 200).

As depicted in the example provided in FIG. 2, the data protection feature 202 is dependent on an application control feature 204, a VPN feature 206, and a policy management feature 208. Moreover, the VPN feature 206 is dependent on a certificate 210 and a VPN application 212. Thus, pursuant to this example, the application control feature 204 (e.g., application control rules), the VPN feature 206 (e.g., a VPN profile based on the certificate 210 and the VPN application 212), and the policy management feature 208 (e.g., policy management policies) are to be configured prior to the data protection feature 202 (e.g., a data protection policy) being configured on a computing device (e.g., to activate data protection on the computing device).

A remote management infrastructure (e.g., one or more of the configuration sources 104-106) can be utilized to configure the features specified in the dependency graph 200. The subsystems that cause the features to be configured can be independent and unrelated. By way of illustration, a first configuration request received from a first configuration source (e.g., the configuration source 1 104 of FIG. 1) can be utilized to configure the data protection feature 202, and a second configuration request received from a second configuration source (e.g., the configuration source N 106 of FIG. 1) can be utilized to configure the application control feature 204; however, the claimed subject matter is not so limited (e.g., one configuration source can include different independent subsystems). Moreover, it is conventionally difficult to express the interrelatedness of the features or to enforce desired values across these features. For example, a master on/off switch for the data protection policy (e.g., the data protection feature 202) can be a single policy value that can be sent as part of a configuration request. However, if the data protection policy were to be activated on the computing device in response to receiving the single policy value (without considering whether the remaining feature described in the dependency graph 200 were previously configured), the data protection policy may not appropriately operate (e.g., since one or more of the remaining features described in the dependency graph 200, upon which the data protection policy is dependent, may not be configured).

Reference is again made to FIG. 1. In the example set forth in FIG. 1, the device management system 112 further includes an evaluation component 126 that evaluates whether the dependency graph 118 for the dependent feature is satisfied. The evaluation component 126 performs the evaluation responsive to a state transition for a feature managed by one of the feature handling components 122-124 (e.g., responsive to a feature being set by one of the feature handling components 122-124 but prior to activation of the feature). Accordingly, state transitions managed by the feature handling components 122-124 can cause the evaluation component 126 to determine a synthetic state of the computing device 102 (e.g., evaluate whether the dependency graph 118 is satisfied).

The evaluation component 126 coordinates configuring a set of interrelated features based on the dependency graph 118 regardless of an order in which configuration requests for the interrelated features are received from the configuration sources 104-106. Thus, policies configured at different times and/or by different configuration sources 104-106 can be coordinated by the evaluation component 126. Policies and device information can be utilized to determine whether the evaluation component 126 can advance through the dependency graph 118.

As noted above, at the computing device 102, a configuration request can be received from a configuration source (e.g., one of the configuration sources 104-106) external to the computing device 102, where the configuration request includes configuration data for the dependent feature (corresponding to the dependency graph 118). Responsive to receiving the configuration request for the dependent feature, the feature handling component for the dependent feature (e.g., one of the feature handling component 122-124) can set the dependent feature based on the configuration data. For instance, the configuration management component 120 can cause the feature handling component for the dependent feature to set the dependent feature based on the configuration data.

The data store 114 can further include a state store 128 that can retain a state of the dependent feature. The state of the dependent feature retained in the data store 114 of the computing device 102 can be modified based on the setting of the dependent feature by the feature handling component. While the state of the dependent feature in the state store 128 can be modified when the dependent feature is set based on the configuration data (e.g., responsive to the configuration request being received at the computing device 102), publication of the state of the dependent feature as modified can be delayed until the evaluation component 126 identifies that the dependency graph 118 for the dependent feature is satisfied. The state store 128 can further include state(s) of one or more of the remaining features in the set specified in the dependency graph 118.

Moreover, the evaluation component 126 performs the evaluation of whether the dependency graph 118 is satisfied subsequent to the dependent feature being set based on the configuration data. For instance, the feature handling component for the dependent feature can cause the evaluation component 126 to evaluate whether the dependency graph 118 for the dependent feature is satisfied by setting the dependent feature based on the configuration data. The evaluation component 126 can evaluate whether the dependency graph 118 is satisfied based at least in part on state(s) retained in the state store 128 of the data store 114.

The evaluation component 126 can configure the dependent feature based of the configuration data when the dependency graph 118 for the dependent feature is satisfied by publishing the state of the dependent feature as modified (from the state store 128) to the computing device 102. Thus, when the dependency graph 118 of the dependent feature is satisfied, the state as modified can be published to the computing device 102. Further, publication of the state of the dependent feature as modified can be delayed until the dependency graph 118 for the dependent feature is satisfied. The publishing of the state of the dependent feature as modified to the computing device 102 can activate the dependent feature as set based on the configuration data on the computing device 102. By way of example, a current policy value of a policy (e.g., the dependent feature) can be modified in the policy store 116 when the state of the dependent feature set based on the configuration data is published. Following this example, the current policy value of the policy remains unchanged in the policy store 116 prior to the evaluation component 126 identifying that the dependency graph 118 for the dependent feature is satisfied.

According to an illustration, the evaluation component 126 can perform the evaluation and identify that the dependency graph 118 for the dependent feature is unsatisfied. While the configuring of the dependent feature based on the configuration data is prohibited, the computing device 102 can receive a different configuration request. The different configuration request can be received by the computing device 102 from a different configuration source external to the computing device 102 or the same configuration source as compared to the configuration request that includes the configuration data for the dependent feature (e.g., the configuration request and the different configuration request can both be received from one of the configuration sources 104-106, the configuration request can be received from the configuration source 1 104 and the different configuration request can be received from the configuration source N 106). The different configuration request can include different configuration data for a particular remaining feature in the set of features (e.g., described in the dependency graph 118 for the dependent feature, the particular remaining feature can be a feature that was previously not configured).

Further following the illustration provided above, the evaluation component 126 can reevaluate whether the dependency graph 118 for the dependent feature is satisfied subsequent to receiving the different configuration data for the particular remaining feature. For example, the particular remaining feature can be set based on the different configuration data from the different configuration request responsive to receiving the different configuration request and prior to reevaluating whether the dependency graph 118 for the dependent feature is satisfied. If the dependency graph 118 for the dependent feature is satisfied when reevaluated by the evaluation component 126, the dependent feature can be configured (e.g., by the evaluation component 126) based on the configuration data for the dependent feature. Alternatively, the configuring of the dependent feature based on the configuration data can continue to be prohibited if the dependency graph 118 for the dependent feature is unsatisfied when reevaluated by the evaluation component 126.

Figure 3:
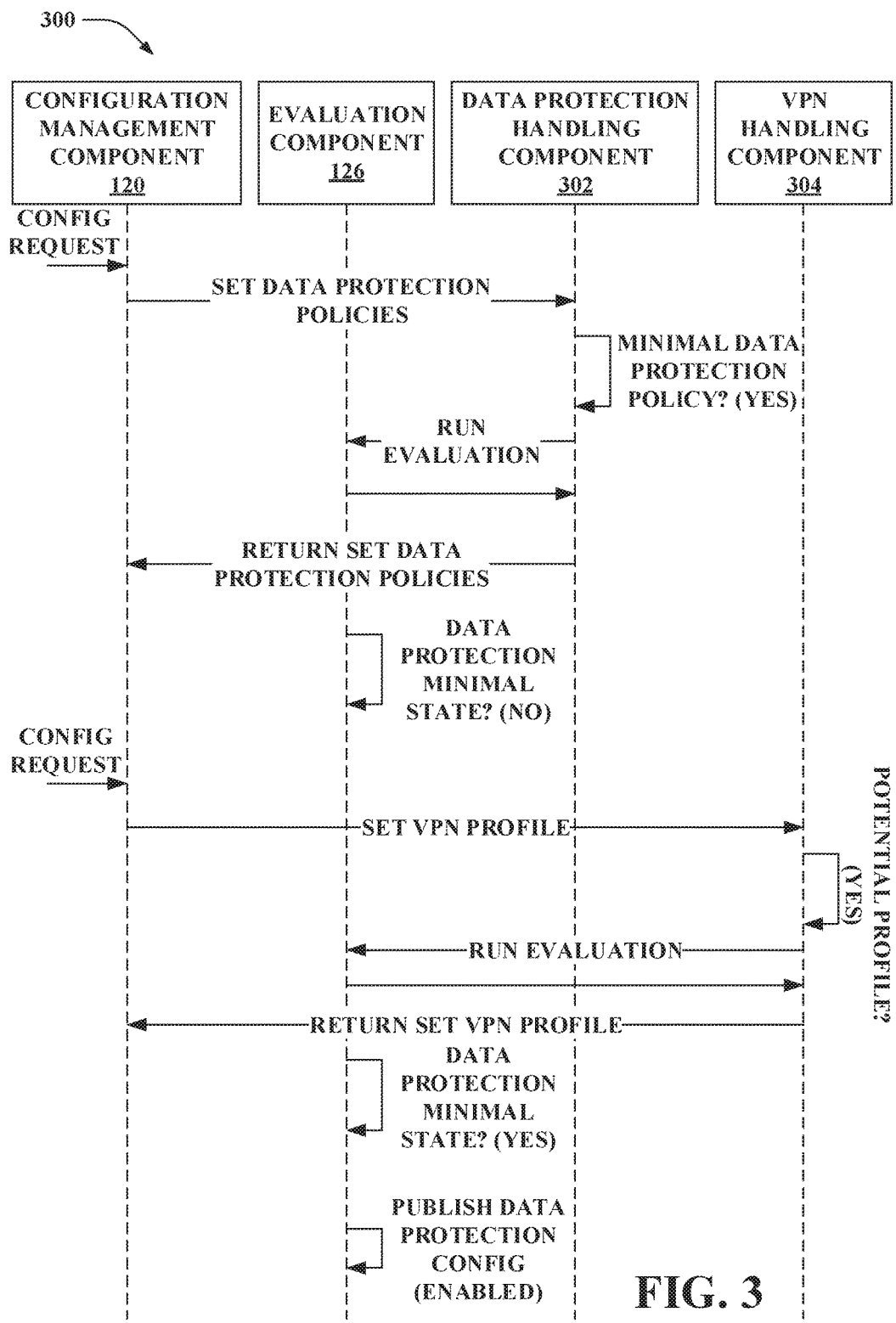
FIG. 3 illustrates an exemplary call flow diagram for a scenario in which data protection policies are enabled, where configuration is controlled utilizing a dependency graph.

Now turning to FIG. 3, illustrated is an exemplary call flow diagram 300 for a scenario in which data protection policies are enabled, where configuration is controlled utilizing a dependency graph (e.g., the dependency graph 118). The dependency graph used for controlling configuration as depicted in the call flow diagram 300 is a simplified version of the dependency graph 200. In the example provided in FIG. 3, the feature handling components 122-124 can include a data protection handling component 302 and a VPN handling component 304. The call flow diagram 300 illustrates exemplary operations that can be performed by the configuration management component 120, the evaluation component 126, the data protection handling component 302, and the VPN handling component 304; however, it is contemplated that the claimed subject matter is not limited to this example.

As depicted in the call flow diagram 300, the configuration management component 120 can receive a configuration request that includes configuration data for the data protection policies. Responsive to receiving of the configuration request, the configuration management component 120 can cause the data protection handling component 302 to set the data protection policies. If a minimum data protection policy is set by the data handling component 302, then the data protection handling component 302 can cause the evaluation component 126 to run the evaluation to determine whether the dependency graph for the data protection policies is satisfied. The data protection handling component 302 can also return an indication that the data protection policies have been set to the configuration management component 120. The evaluation component 126 can determine whether a minimal data protection state exists on the computing device (e.g., determine whether the dependency graph is satisfied). In the example of FIG. 3, the evaluation component 126 determines that the minimal data protection state is not met after setting the data protection policies (e.g., the dependency graph is unsatisfied).

Further following the call flow diagram 300, the configuration management component 120 can receive a different configuration request. The different configuration request can include a VPN profile for the computing device. Responsive to receipt of the different configuration request, the configuration management component 120 can cause the VPN handling component 304 to set the VPN profile. If the VPN handling component 304 identifies the VPN profile as a potential profile, then the VPN handling component 304 can cause the evaluation component 126 to run an evaluation concerning whether the dependency graph for the data protection policies is satisfied (e.g., reevaluate whether the dependency graph is satisfied). The VPN handling component 304 can also return an indication that the VPN profile has been set to the configuration management component 120. Again, the evaluation component 126 can evaluate whether the minimal data protection state exists on the computing device (e.g., determine whether the dependency graph for the data protection feature is satisfied). As shown in FIG. 3, the evaluation component 126 can identify that the minimal data protection state is met (e.g., the dependency graph is satisfied). Further, the evaluation component 126 can publish the state to the computing device to activate the data protection policies on the computing device (e.g., publish that the data protection configuration is enabled).

Figure 4:
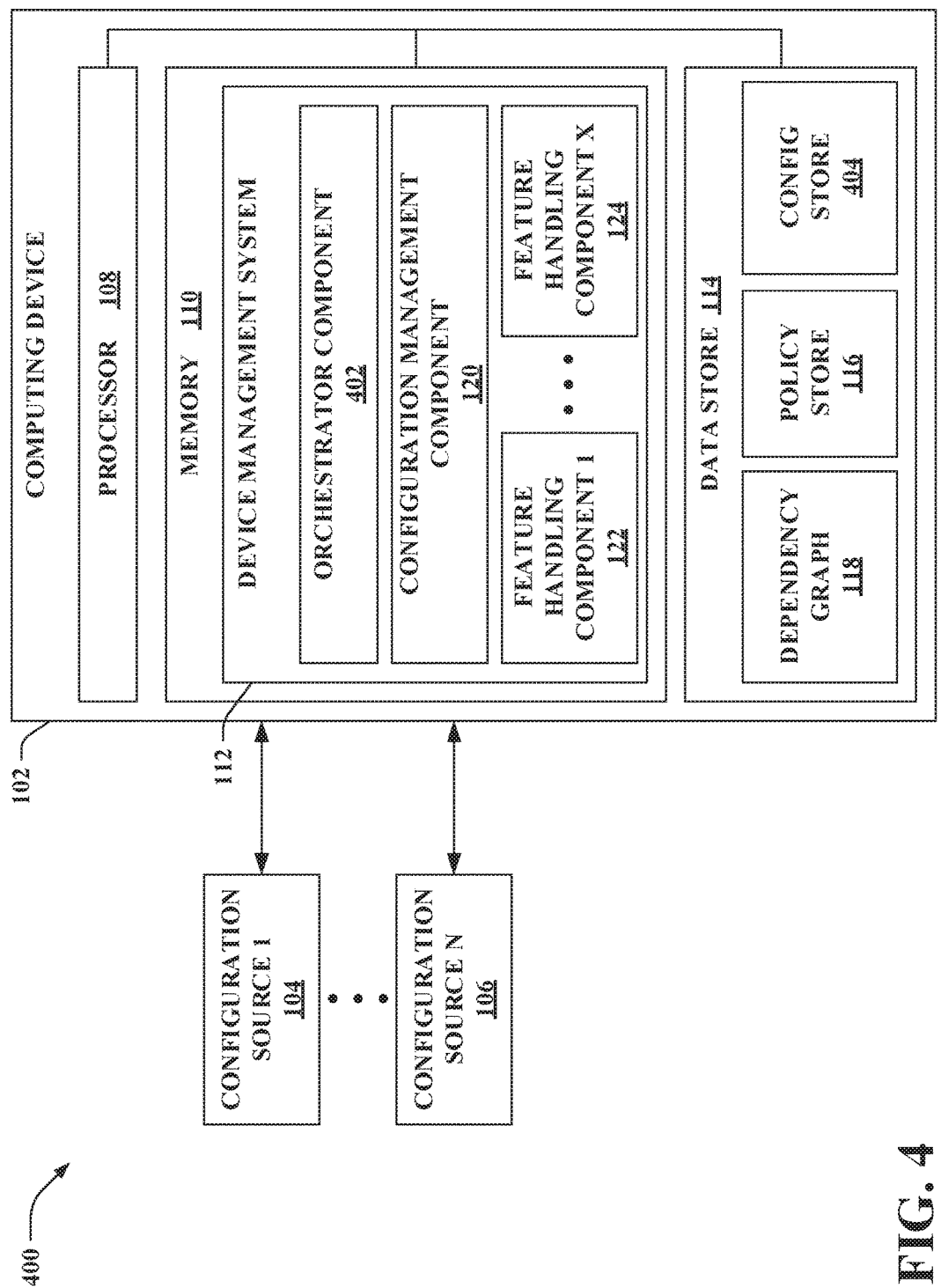
FIG. 4 illustrates a functional block diagram of another exemplary system that controls configuration of the computing device.

Now turning to FIG. 4, illustrated is another exemplary system 400 of controlling configuration of the computing device 102. The system 400 includes the computing device 102 and the configuration sources 104-106. The computing device 102 includes the processor 108, the memory 110, and the data store 114. The memory 110 includes the device management system 112, which further includes the configuration management component 120 and the feature handling components 122-124 as described above. The data store 114 includes the policy store 116 and the dependency graph 118 for the dependent feature.

Similar to above, a configuration request can be received from one of the configuration sources 104-106 external to the computing device 102. The configuration request can include configuration data for the dependent feature (e.g., corresponding to the dependency graph 118). As described above, the device management system 112 can evaluate whether the dependency graph 118 for the dependent feature is satisfied subsequent to the configuration request that includes the configuration data for the dependent feature being received at the computing device 102. The device management system 112 can further configure the dependent feature based on the configuration data when the dependency graph 118 for the dependent feature is satisfied.

In the example set forth in FIG. 4, the device management system 112 further includes an orchestrator component 402. Responsive to receiving the configuration request at the computing device 102, the orchestrator component 402 can retain the configuration data for the dependent feature in a configuration store 404 of the data store 114 of the computing device 102. The orchestrator component 402 can intercept the configuration request from the configuration source (e.g., prior to the configuration data reaching the configuration management component 120). The orchestrator component 402 can further evaluate whether the dependency graph 118 for the dependent feature is satisfied. The orchestrator component 402 can evaluate whether the dependency graph 118 for the dependent feature is satisfied based on configuration data retained in the configuration store 404 and/or configuration data in a payload of a received configuration request. Responsive to identifying that the dependency graph 118 for the dependent feature is satisfied, the orchestrator component 402 can enable the dependent feature to be configured. The dependent feature can be configured based on the configuration data retained in the configuration store 404 of the data store 114 of the computing device 102.

In the example set forth in FIG. 4, the orchestrator component 402 can check the dependency graph 118 before providing configuration data to one or more of the feature handling components 122-124. In contrast, in the example described in FIG. 1, the evaluation component 126 can check the dependency graph 118 after one or more of the feature handling components 122-124 has received and processed configuration data.

According to an illustration, the orchestrator component 402 can perform the evaluation and identify that the dependency graph 118 for the dependent feature is unsatisfied. While the configuring of the dependent feature based on the configuration data is prohibited, the computing device 102 can receive a different configuration request. The different configuration request can be received by the computing device 102 from a different configuration source external to the computing device 102 or the same configuration source as compared to the configuration request that includes the configuration data for the dependent feature (e.g., the configuration request and the different configuration request can both be received from one of the configuration sources 104-106, the configuration request can be received from the configuration source 1 104 and the different configuration request can be received from the configuration source N 106). The different configuration request can include different configuration data for a particular remaining feature in the set of features (e.g., described in the dependency graph 118 for the dependent feature, the particular remaining feature can be a feature that was previously not configured).

Continuing the illustration set forth above, the different configuration data for the particular remaining feature can be retained in the configuration store 404 of the data store 114 of the computing device 102 responsive to the computing device 102 receiving the different configuration request. Moreover, the orchestrator component 402 can reevaluate whether the dependency graph 118 for the dependent feature is satisfied subsequent to receiving the different configuration request for the particular remaining feature. Upon identifying that the dependency graph 118 for the dependent feature is satisfied, the dependent feature and the particular remaining feature can be configured. The orchestrator component 402 can enable the configuration management component 120 to cause the feature handling components 122-124 to configure the dependent feature and the particular remaining feature (as well as other remaining features specified in the dependency graph 118). The dependent feature and the particular remaining feature can be configured based on the configuration data and the different configuration data retained in the configuration store 404 of the data store 114 of the computing device 102. Moreover, an order of the configuring of the dependent feature and the particular remaining feature can be managed by the orchestrator component 402 based on the interdependencies specified in the dependency graph 118; accordingly, rules from the dependency graph 118 can control the configuration order once the dependency graph 118 is satisfied.

Reference is now generally made to FIGS. 1 and 4. In the embodiment shown in FIG. 1, configuration data for a feature (e.g., the dependent feature corresponding to the dependency graph 118) can be implemented upon receipt from a configuration source (e.g., one of the configuration sources 104-106). However, device state (e.g., a current policy value of a policy in the policy store 116) does not directly reflect the implementation of the configuration data; rather, a delay in publishing the device state until the dependency graph 118 is satisfied is employed. In contrast, in the embodiment shown in FIG. 4, dependencies specified by the dependency graph 118 are evaluated before applying the configuration data to set features; rather, configuration data for feature(s) is stored in the configuration store 404, and once the dependency graph 118 is satisfied, the features(s) are configured based on the configuration data from the configuration store 404. According to other embodiments, it is contemplated that the device management system 112 can include both the evaluation component 126 of FIG. 1 and the orchestration component 402 of FIG. 4.

Figure 5:
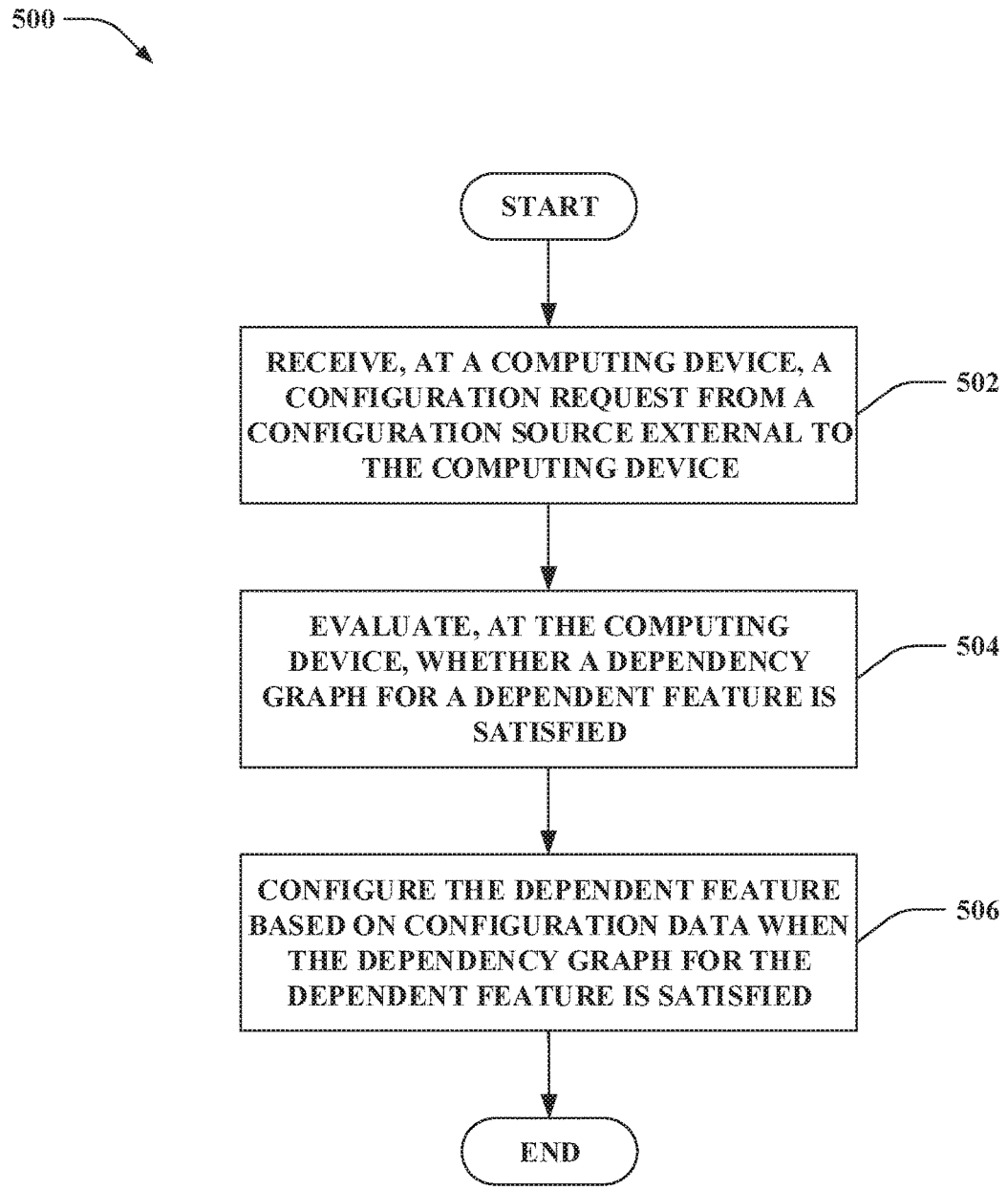
FIG. 5 is a flow diagram that illustrates an exemplary methodology of controlling configuration of a computing device.
Figure 6:
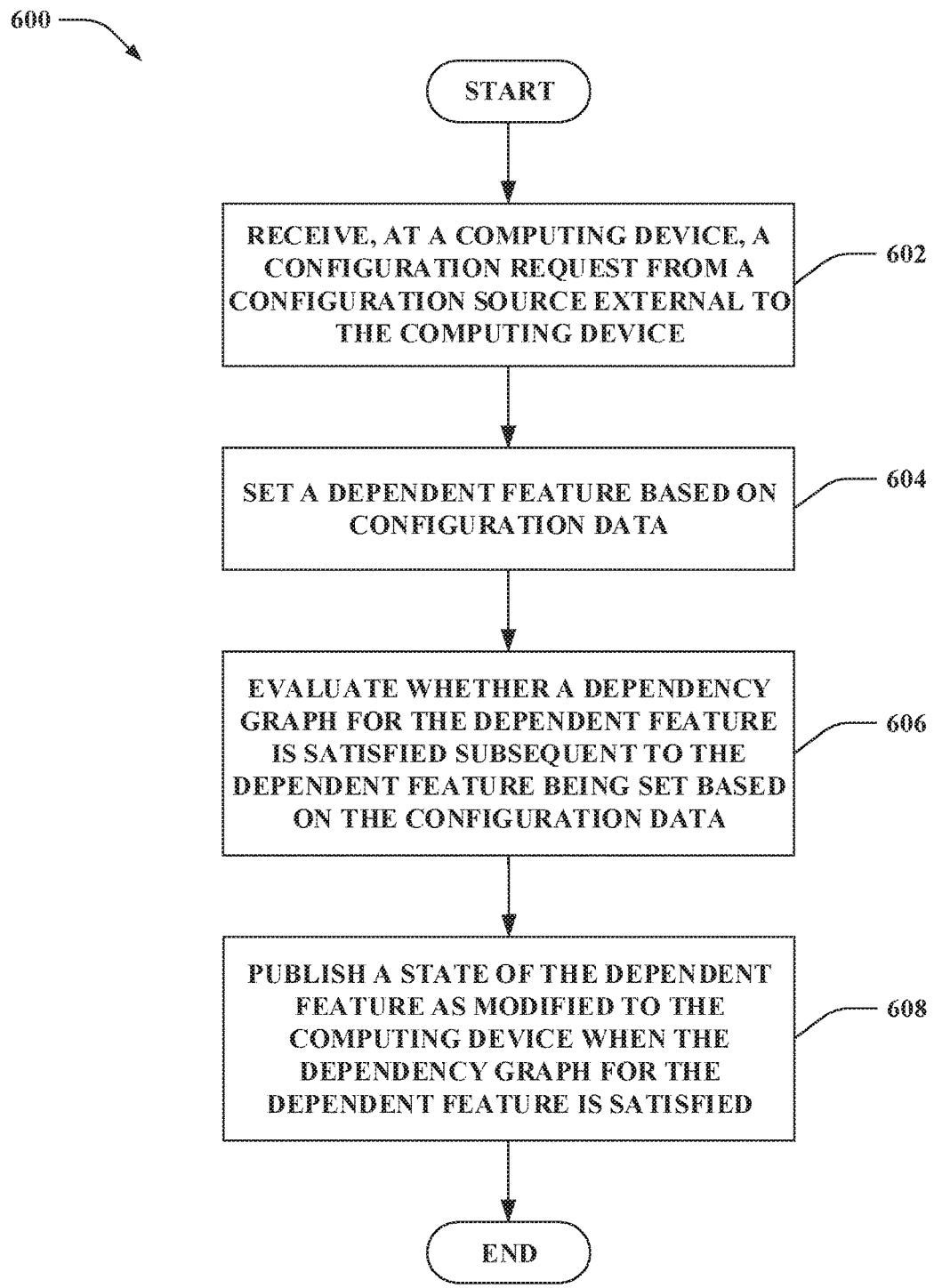
FIG. 6 is a flow diagram that illustrates another exemplary methodology of controlling configuration of a computing device.
Figure 7:
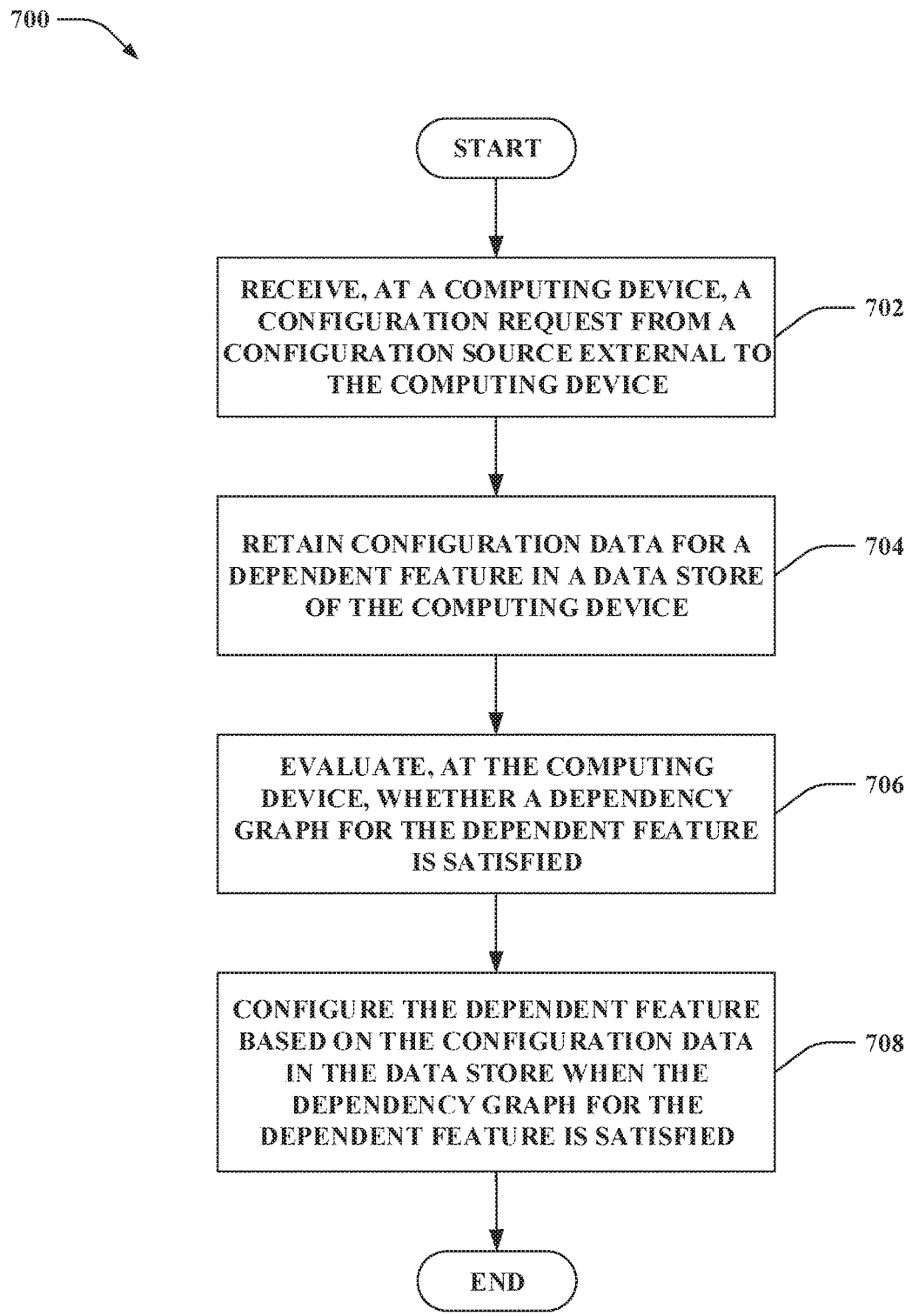
FIG. 7 is a flow diagram that illustrates yet another exemplary methodology of controlling configuration of a computing device.

FIGS. 5-7 illustrate exemplary methodologies relating to controlling configuration of a computing device. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

FIG. 5 illustrates a methodology 500 of controlling configuration of a computing device. At 502, a configuration request can be received, at the computing device, from a configuration source external to the computing device. The configuration request can include configuration data for a dependent feature. At 504, an evaluation can be performed, at the computing device, to determine whether a dependency graph for the dependent feature is satisfied. The dependency graph for the dependent feature can specify interdependencies between configurations of a set of features such that remaining features in the set of features are to be configured prior to enabling the dependent feature to be configured. At 506, the dependent feature can be configured based on the configuration data when the dependency graph for the dependent feature is satisfied. The configuring of the dependent feature based on the configuration data can be prohibited prior to the dependency graph for the dependent feature being satisfied.

With reference to FIG. 6, illustrated is another methodology 600 of controlling configuration of a computing device. At 602, a configuration request can be received, at the computing device, from a configuration source external to the computing device. The configuration request can include configuration data for a dependent feature. At 604, responsive to receiving the configuration request, the dependent feature can be set based on the configuration data. A state of the dependent feature retained in a data store of the computing device can be modified based on the dependent feature being set. Further, the dependent feature can be set without activating the dependent feature on the computing device. At 606, an evaluation can be performed, at the computing device (e.g., by the evaluation component 126), to determine whether a dependency graph for the dependent feature is satisfied. The evaluation can be performed subsequent to the dependent feature being set based on the configuration data. At 608, a state of the dependent feature as modified can be published to the computing device when the dependency graph for the dependent feature is satisfied. Moreover, publication of the state of the dependent feature as modified is prohibited while the dependency graph for the dependent feature remains unsatisfied. Further, the publishing of the state of the dependent feature as modified to the computing device activates the dependent feature as set based on the configuration data on the computing device.

Turning to FIG. 7, illustrated is yet another methodology 700 of controlling configuration of a computing device. At 702, a configuration request can be received, at the computing device, from a configuration source external to the computing device. The configuration request can include configuration data for a dependent feature. At 704, the configuration data for the dependent feature can be retained in a data store of the computing device. At 706, an evaluation can be performed, at the computing device (e.g., by the orchestrator component 402), to determine whether a dependency graph for the dependent feature is satisfied. At 708, the dependent feature can be configured based on the configuration data in the data store when the dependency graph for the dependent feature is satisfied.

Figure 8:
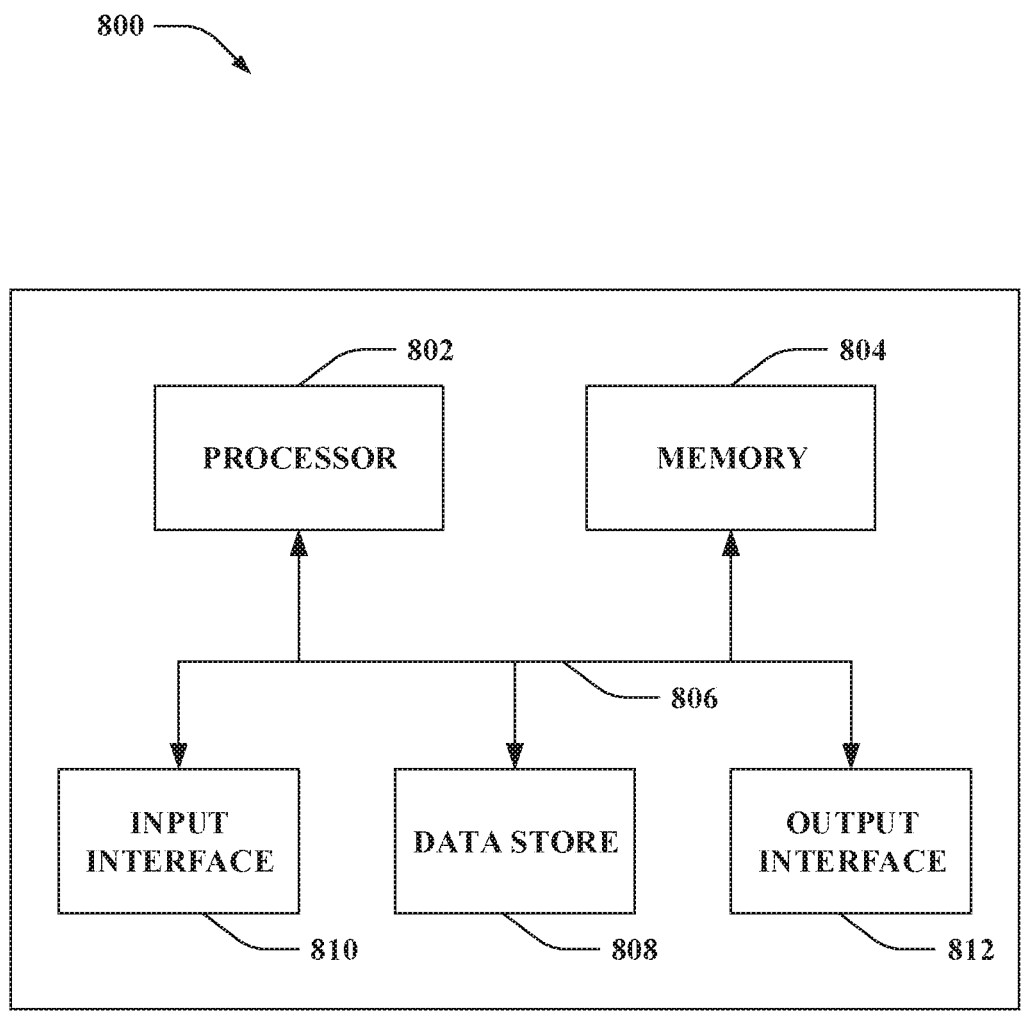
FIG. 8 illustrates an exemplary computing device.

Referring now to FIG. 8, a high-level illustration of an exemplary computing device 800 that can be used in accordance with the systems and methodologies disclosed herein is illustrated. For instance, the computing device 800 can be or include the computing device 102. By way of another example, the configuration sources 104-106 may be or include the computing device 800. The computing device 800 includes at least one processor 802 that executes instructions that are stored in a memory 804. The instructions may be, for instance, instructions for implementing functionality described as being carried out by one or more components discussed above or instructions for implementing one or more of the methods described above. The processor 802 may access the memory 804 by way of a system bus 806. In addition to storing executable instructions, the memory 804 may also store dependency graph(s), values of policies, state(s) of feature(s), configuration data, and so forth.

The computing device 800 additionally includes a data store 808 that is accessible by the processor 802 by way of the system bus 806. The data store 808 may include executable instructions, dependency graph(s), values of policies, state(s) of feature(s), configuration data, etc. The computing device 800 also includes an input interface 810 that allows external devices to communicate with the computing device 800. For instance, the input interface 810 may be used to receive instructions from an external computer device, from a user, etc. The computing device 800 also includes an output interface 812 that interfaces the computing device 800 with one or more external devices. For example, the computing device 800 may display text, images, etc. by way of the output interface 812.

It is contemplated that the external devices that communicate with the computing device 800 via the input interface 810 and the output interface 812 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 800 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 800 may be a distributed system. Thus, for instance, several devices may be in communication by way of a network connection and may collectively perform tasks described as being performed by the computing device 800.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, as used herein, the term "exemplary" is intended to mean "serving as an illustration or example of something."

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A method of controlling configuration of a computing device, comprising:
    receiving, at the computing device, a configuration request from a configuration source external to the computing device, the configuration request comprising configuration data for a dependent feature;
    responsive to receiving the configuration request, setting the dependent feature based on the configuration data, wherein a state of the dependent feature retained in a data store of the computing device is modified based on the setting of the dependent feature;
    evaluating, at the computing device, whether a dependency graph for the dependent feature is satisfied, the dependency graph for the dependent feature specifies interdependencies between configurations of a set of features such that remaining features in the set of features are to be configured prior to enabling the dependent feature to be configured, wherein evaluating whether the dependency graph for the dependent feature is satisfied is performed subsequent to the dependent feature being set based on the configuration data; and
    configuring the dependent feature based on the configuration data when the dependency graph for the dependent feature is satisfied, wherein the configuring of the dependent feature based on the configuration data is prohibited prior to the dependency graph for the dependent feature being satisfied, and wherein the configuring of the dependent feature comprises publishing the state of the dependent feature as modified to the computing device.

2. The method of claim 1, wherein at least one of the remaining features in the set is configured by a differing configuration source external to the computing device.

3. The method of claim 1, wherein the publishing of the state of the dependent feature as modified to the computing device activates the dependent feature as set based on the configuration data on the computing device.

4. The method of claim 1, wherein publication of the state of the dependent feature as modified is delayed until the dependency graph for the dependent feature is satisfied.

5. The method of claim 1, further comprising:
    subsequent to identifying that the dependency graph for the dependent feature is unsatisfied and while the configuring of the dependent feature based on the configuration data is prohibited:
        receiving, at the computing device, a different configuration request, the different configuration request comprising different configuration data for a particular remaining feature in the set of features; and
        reevaluating, at the computing device, whether the dependency graph for the dependent feature is satisfied subsequent to the receiving of the different configuration data for the particular remaining feature; and
    configuring the dependent feature based on the configuration data if the dependency graph for the dependent feature is satisfied when reevaluated, wherein the configuring of the dependent feature based on the configuration data continues to be prohibited if the dependency graph for the dependent feature is unsatisfied when reevaluated.

6. The method of claim 5, further comprising:
    setting the particular remaining feature based on the different configuration data from the different configuration request responsive to receiving the different configuration request and prior to reevaluating whether the dependency graph for the dependent feature is satisfied.

7. The method of claim 5, further comprising:
    responsive to receiving the configuration request, retaining the configuration data for the dependent feature in the data store of the computing device; and
    responsive to receiving the different configuration request, retaining the different configuration data for the particular remaining feature in the data store of the computing device;
    wherein the dependent feature and the particular remaining feature are configured responsive to identifying that the dependency graph for the dependent feature is satisfied, the dependent feature and the particular remaining feature being configured based on the configuration data and the different configuration data retained in the data store of the computing device, and an order of the configuring of the dependent feature and the particular remaining feature being managed based on the interdependencies specified in the dependency graph.

8. The method of claim 1, wherein the configuration data comprises at least one of a policy value, a certificate, a profile, or a setting for the dependent feature.

9. The method of claim 1, wherein the dependent feature is a data protection feature and the configuration data comprises a policy value for the data protection feature.

10. A computing device, comprising:
a data store that comprises a dependency graph for a dependent feature, the dependency graph for the dependent feature specifies interdependencies between configurations of a set of features such that remaining features in the set of features are to be configured prior to enabling the dependent feature to be configured;
at least one processor; and
memory that comprises computer-executable instructions that, when executed by the at least one processor, cause the at least one processor to perform acts including:
receiving a configuration request from a configuration source external to the computing device, the configuration request comprising configuration data for the dependent feature;
responsive to receiving the configuration request, setting the dependent feature based on the configuration data, wherein a state of the dependent feature retained in the data store of the computing device is modified based on the setting of the dependent feature;
subsequent to receiving the configuration request and subsequent to the dependent feature being set based on the configuration data, evaluating whether the dependency graph for the dependent feature is satisfied; and
configuring the dependent feature based on the configuration data when the dependency graph for the dependent feature is satisfied, wherein the configuring of the dependent feature based on the configuration data is prohibited prior to the dependency graph for the dependent feature being satisfied, and wherein the configuring of the dependent feature comprises publishing the state of the dependent feature as modified to the computing device.

11. The computing device of claim 10, wherein the data store further comprises a different dependency graph for a different dependent feature, the different dependency graph for the different dependent feature specifies interdependencies between configurations of a different set of features such that remaining features in the different set of features are to be configured prior to enabling the different dependent feature to be configured.

12. The computing device of claim 10, the memory further comprising computer-executable instructions that, when executed by the at least one processor, cause the at least one processor to perform acts including:
subsequent to identifying that the dependency graph for the dependent feature is unsatisfied and while the configuring of the dependent feature based on the configuration data is prohibited:
receiving a different configuration request from a different configuration source external to the computing device, the different configuration request comprising different configuration data for a particular remaining feature in the set of features; and
reevaluating whether the dependency graph for the dependent feature is satisfied subsequent to the receiving of the different configuration data for the particular remaining feature; and
configuring the dependent feature based on the configuration data if the dependency graph for the dependent feature is satisfied when reevaluated, wherein the configuring of the dependent feature based on the configuration data continues to be prohibited if the dependency graph for the dependent feature is unsatisfied when reevaluated.

13. The computing device of claim 10, wherein the dependent feature is configured by a first plugin and a particular remaining feature in the set of features is configured by a second plugin.

14. The computing device of claim 10, wherein at least one of the remaining features in the set is configured by a differing configuration source external to the computing device.

15. The computing device of claim 10, wherein the configuration data comprises at least one of a policy value, a certificate, a profile, or a setting for the dependent feature.

16. The computing device of claim 10, wherein the publishing of the state of the dependent feature as modified to the computing device activates the dependent feature as set based on the configuration data on the computing device.

17. The computing device of claim 10, wherein publication of the state of the dependent feature as modified is delayed until the dependency graph for the dependent feature is satisfied.

18. A computing device, comprising:
a data store that comprises a dependency graph for a dependent feature, the dependency graph for the dependent feature specifies interdependencies between configurations of a set of features such that remaining features in the set of features are to be configured prior to enabling the dependent feature to be configured;
at least one processor; and
memory that comprises computer-executable instructions that, when executed by the at least one processor, cause the at least one processor to perform acts including:
receiving a configuration request from a configuration source external to the computing device, the configuration request comprising configuration data for the dependent feature;
responsive to receiving the configuration request, setting the dependent feature based on the configuration data, wherein a state of the dependent feature retained in the data store of the computing device is modified based on the setting of the dependent feature;
evaluating whether the dependency graph for the dependent feature is satisfied subsequent to the dependent feature being set based on the configuration data; and
publishing the state of the dependent feature as modified to the computing device when the dependency graph for the dependent feature is satisfied, wherein publication of the state of the dependent feature as modified is prohibited while the dependency graph for the dependent feature remains unsatisfied.

19. The computing device of claim 18, wherein the publishing of the state of the dependent feature as modified to the computing device activates the dependent feature as set based on the configuration data on the computing device.

20. The computing device of claim 18, wherein at least one of the remaining features in the set is configured by a differing configuration source external to the computing device.

* * * * *